A. STUCKI.
ROLLER SIDE BEARING.
APPLICATION FILED JAN. 30, 1914.

1,232,118.

Patented July 3, 1917.
3 SHEETS—SHEET 1.

WITNESSES
A. W. Calvin.
Elbert L. Hyde

INVENTOR
Arnold Stucki
By Fredk W. Winter
ATTORNEYS

A. STUCKI.
ROLLER SIDE BEARING.
APPLICATION FILED JAN. 30, 1914.

1,232,118.

Patented July 3, 1917.
3 SHEETS—SHEET 3.

UNITED STATES PATENT OFFICE.

ARNOLD STUCKI, OF PITTSBURGH, PENNSYLVANIA.

ROLLER SIDE BEARING.

1,232,118. Specification of Letters Patent. Patented July 3, 1917.

Application filed January 30, 1914. Serial No. 815,543.

*To all whom it may concern:*

Be it known that I, ARNOLD STUCKI, a resident of Pittsburgh, in the county of Allegheny and State of Pennsylvania, have invented a new and useful Improvement in Roller Side Bearings, of which the following is a specification.

This invention relates to side bearings for railway cars. The object of the invention is to provide a side bearing which is practically frictionless under all service conditions, whether normal or abnormal, which performs all other functions of side bearings, which is efficient and durable in service, which is simple in construction and therefore inexpensive both as to first cost and as to up-keep, and in which the anti-friction member is returned to normal position in the housing by gravity and yet travels in a horizontal plane.

The invention comprises the construction and arrangement of parts hereinafter described and claimed.

Figure 1:
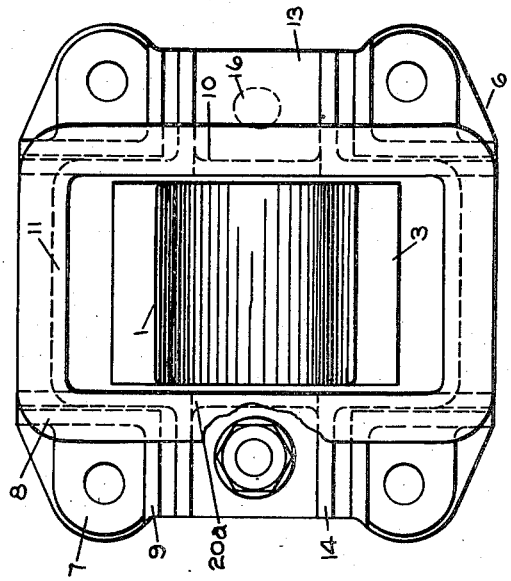
Figure 4:
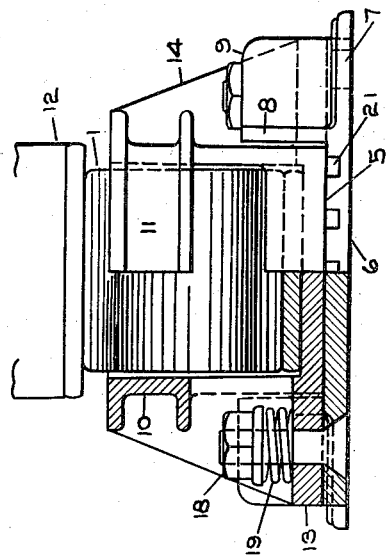
Figure 2:
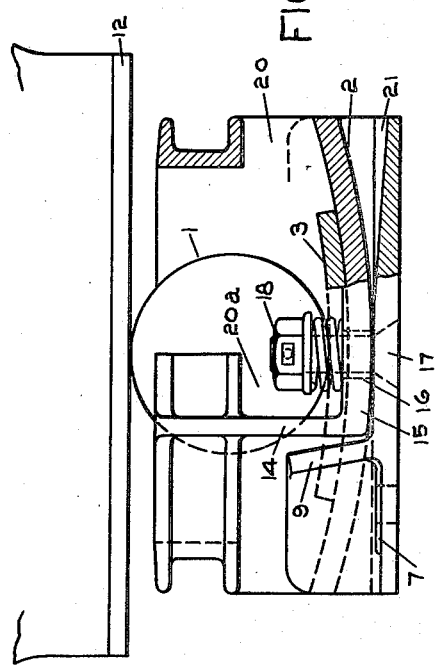
Figure 3:
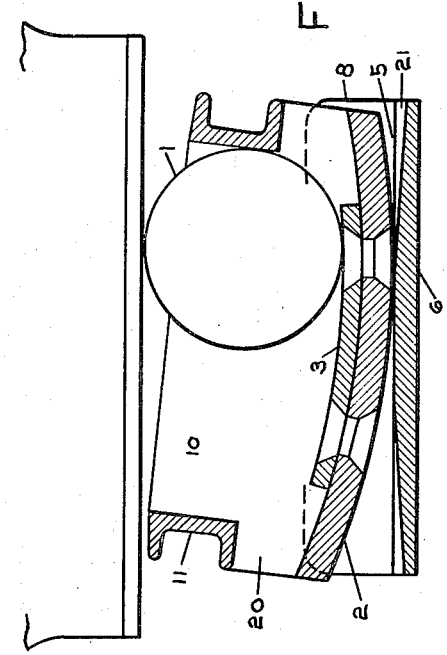
Figure 5:
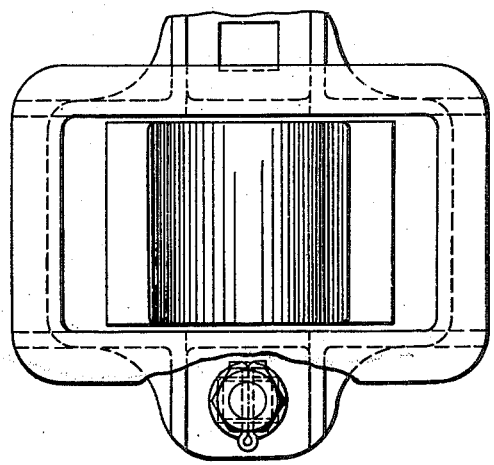
Figure 6:
Figure 6:
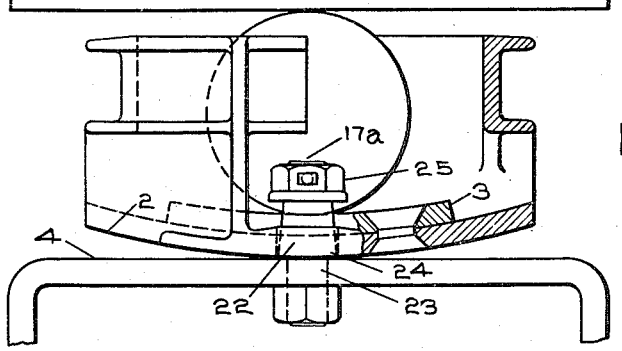
Figure 7:
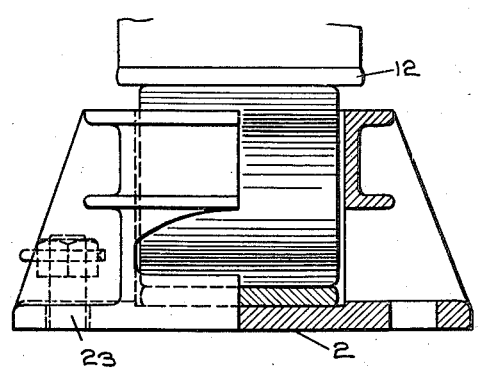
Figure 11:
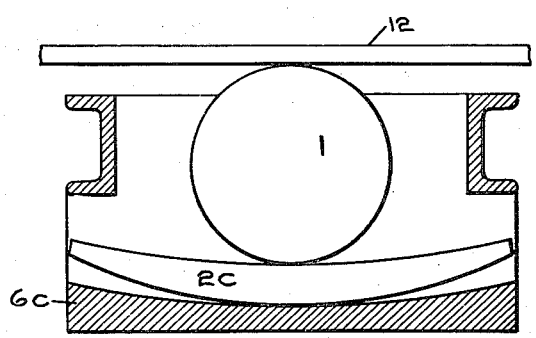

In the drawing Figure 1 represents a plan view of one form of side bearing embodying the invention; Fig. 2 is in part a side elevation, and in part a vertical longitudinal section thereof; Fig. 3 is a longitudinal section, showing the antifriction member near one end of the housing; Fig. 4 is in part an end view and in part a vertical cross section thereof; Figs. 5, 6 and 7 are views corresponding to Figs. 1, 2 and 4, showing another embodiment of the invention; Figs. 8, 9 and 10 are similar views illustrating still another modification; and Fig. 11 is a diagrammatic view of another arrangement.

The antifriction member in the present side bearing may be a ball, a cone, or a cylinder, and is shown as a plain cylindrical roller 1, preferably formed of rolled spring steel. Said roller rests upon a seat 2, which in the form shown in Figs. 1 to 4 is a rocking member of uniform thickness from end to end, and having its lower surface curved or inclined upwardly toward each end of the bearing. The upper face of the seat may be provided with a suitable bearing surface for the roller, which is shown as a plate 3 of spring steel, riveted or otherwise rigidly secured to the seat member, although this is not essential.

The seat is arranged to rock or roll with reference to the lower bolster member. This movement may be accomplished in several ways. For example, the seat may rest directly upon the upper surface of the lower truck bolster 4, as in Figs. 5, 6 and 7, but it preferably rests upon a supporting and guiding member rigidly secured to the lower bolster, as shown in Figs. 1 to 4. In this form the seat rocks upon the upper surface 5 of a support 6, which comprises a plate or casting equipped with apertured corner ears 7 for securing it to the truck bolster. At each corner the support 6 is provided with vertical L-shaped wall or barrier, having a longitudinally extending portion 8 and a transversely extending portion 9. The longitudinal walls 8 form guides between which the seat 2 rocks, while the transverse walls 9 form rigid stops or barriers for preventing the seat member from shifting bodily longitudinally in the bearing.

Figure 8:
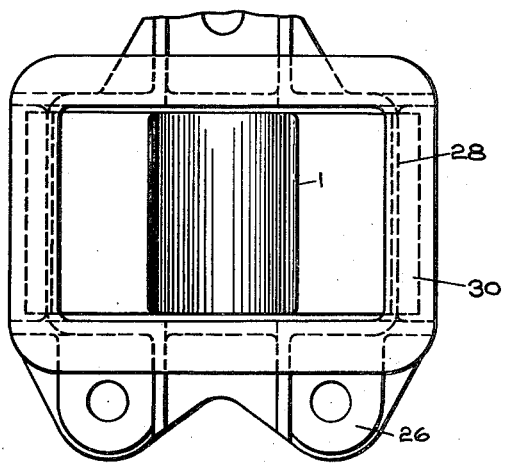

The rocker or seat member 2 may be in the form of a simple plate, as shown in Fig. 8, but in the form shown in Fig. 1 it is provided with vertical side and end walls, marked 10 and 11, respectively, and which form a housing for confining the roller in the bearing. These walls are of material height, extending fairly close to the top of the roller 1, which has its upper surface exposed for directly supporting the upper bolster member 12 thereon. The end walls or barriers 11 have their upper portions substantially vertical, as shown in Fig. 2, so that the roller cannot roll up over the same, said end walls forming absolute stops to limit the travel of the roller in both directions. The side walls extend longitudinally of the bearing and work between the longitudinal walls 8 of the supporting member 6, and prevent sidewise movement of the movable parts of the bearing. The top edges of the seat and end walls are broad and flat and form an efficient and satisfactory side bearing, even if the roller is lost in a wreck or from other causes.

Each of the side walls 10 is provided with a laterally extending channel or projection 13, the vertical members 14 of which are arranged to abut the walls 9 of the support 6 when the roller reaches either end of the bearing and which also assist in preventing the rocker from being shifted bodily in the bearing by any external blow or shock. The bottom members 15 of the channels are each provided with a longitudinal slot 16 to receive the shank of a bolt 17, having a nut 18 threaded on its upper end for confining the rocking member in the bearing. The lower faces of the nuts 18 lie somewhat above the upper face of the bottoms of channels 13, in order to permit the member 2 to rock in the bearing, and said nuts may be pinned or otherwise secured to the bolts to prevent them from being lost. Also, if desired, a light compression spring 19 may be placed between each nut and the bottoms 15 of the channels to hold the bolts 17 upwardly in the bearing. Said springs need only be strong enough to hold up the bolts 17 but, if desired, may be heavier springs of a strength sufficient to assist in returning the rocking member to normal position shown in Fig. 2, whenever it departs from said position.

To prevent the housing from accumulating dirt, which would clog the movement of the roller, the walls thereof are preferably of open or skeleton construction, the end walls being provided with large openings 20, extending for the full width of the housing and for a considerable distance upwardly, while the side walls 4 are also provided with similar openings 20ª. To prevent dirt from accumulating between the surfaces of the rocking member 2 and the supporting member 6, the latter is provided with one or a plurality of longitudinal slots or grooves 21, opening at the end of the bearing, and which preferably are shallow at the middle of the bearing and increase in depth toward each end thereof. These grooves collect the dirt, which travels to the end of the bearing where it is discharged.

In operation, as the truck bolsters swivel in one direction or the other around the king pin, the roller 7 rolls between the upper bolster member 12 and the bottom of the bearing toward the position shown in Fig. 3. Under normal conditions, as when the car is traveling upon a straight track, there may be a slight clearance between the upper bolster and the surface of the roller, or, if desired, the upper bolster may rest directly upon the roller at all times. However, on swiveling movement of the truck the upper bolster is in contact with the roller on one or the other of the two sides of the truck. The pressure of the upper bolster upon the roller, as it travels toward either end of the bearing, forces down the rocking member 2, which, in the form shown in Fig. 1, is of uniform thickness from end to end, or at least for that portion of its length which is contacted by the roller in movement from one extreme end position in the bearing to the other. Consequently, the roller travels in a horizontal plane without other than rolling friction and without the necessity of lifting the car body. The bearing, therefore, permits an unusually free swiveling of the truck underneath the car body. If the upper bolster is lifted off from the roller while the latter is displaced from central position in the housing, the roller is returned by gravity to central position therein. In other words, whenever the roller is away from central position in the housing, for example, in the position shown in Fig. 3, the rocking member 2 is unbalanced about the roller as a fulcrum, so that one end of the rocking member is heavier than the other. When the upper bolster lifts the heavier end of the rocking member sinks, thereby inducing movement of the roller to central position in the housing. The roller is consequently returned by gravity without other than rolling friction.

Figs. 5, 6 and 7 show a modified form of the invention in which the rocking member 2 rests directly upon the upper surface of the lower bolster member 4. In this case the supporting member 6 shown in Fig. 1, and above described, is entirely omitted, but the construction and arrangement of the rocking member 2 is the same. It has side and end walls forming a housing for confining the roller and may also be equipped with a bottom bearing member on which the antifriction member rests. In this case, the bolt 17ª has a shank, the upper portion 22 of which is conical, while its lower portion 23 is a reduced cylinder, thereby forming a shoulder 24 which rests on the upper surface of the lower bolster member. The bolt is held to the bolster by a nut 25 on its lower end and is thereby prevented from rising with respect to the lower bolster.

This form of the invention is somewhat simpler than that before described and can, therefore, be made at lower cost. Both bolsters, however, have the advantage that they reduce wear caused by friction. In each case, the roller, which is formed of rolled spring steel, rolls upon a bearing surface formed of the same metal, while the rocking member 2, which rocks on the supporting member 6 in the one case and the truck bolster 4 in the other case, may be formed of cast steel of the same hardness and wearing qualities as those members.

Figure 9:
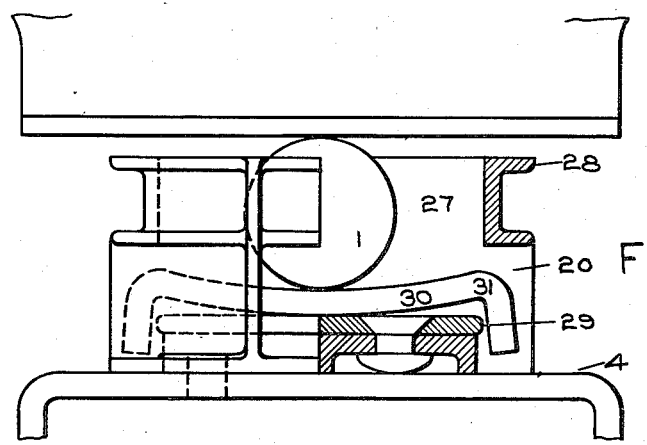
Figure 10:
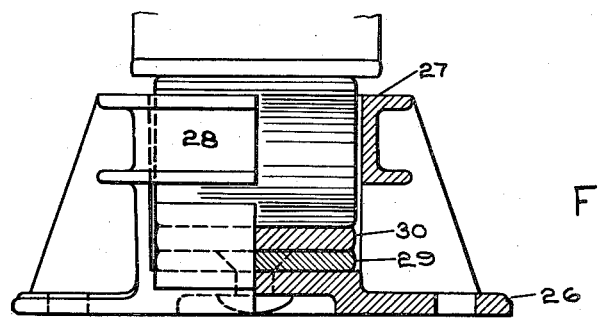

Figs. 8, 9 and 10 show a modified arrangement of the invention in which the housing is rigidly connected to the lower bolster member, while the antifriction member rolls on a member movable with respect to said housing. In this form the housing is provided with apertured ears 26 for securing it to the lower bolster member, and is provided with side and end walls or barriers, marked 27 and 28, for confining the rolling antifriction member 1. The bottom of the housing is provided with a level, flat supporting member 29, which is shown as rigidly secured to the housing, and upon which the rocking member 30 is supported. Said rocking member comprises a substantially rectangular plate of uniform thickness from end to end and curved so that it is convex on its lower surface. The end edges of said plate are bent downwardly, as at 31, to form locking members which project below the plane of the supporting plate 29 and prevent the rocking member 30 from shifting bodily endwise on its support. They also prevent escape of the rocking member from the bearing, as said member cannot be removed from either of the openings 20 unless the roller is lifted out. It will also be observed that the bent end edges 31 of the rocking member diverge downwardly away from each other, so that their lower edges are not liable to catch under the bearing plate 29 and prevent the rocking member from returning to normal position. In this form of the invention the roller, the rocking member 30 and the bearing plate 29 are preferably all made of spring steel.

In the three forms of bearing so far described the rocking member is of uniform thickness from end to end for the reason that it rocks upon a level or horizontal surface. This, however, is not essential, as will be readily understood from Fig. 11, where the rocking member 2ᶜ is thicker at the middle than at the ends of the bearing, due to the fact that the support 6ᵇ, upon which it rests, and which may be the lower bolster itself or a part secured thereto, has a curved upper surface on which member 2ᶜ rocks. The thickness of the rocking member is, however, so proportioned with reference to the curvature or inclination of the surface of member 6ᶜ on which it rocks that the antifriction member 1 travels from end to end of the bearing in the same horizontal plane.

The bearing described is simple, can be manufactured at low cost and is not liable to easily get out of order. In all cases the roller travels on a horizontal plane without other than rolling friction and without lifting the car body on swiveling movement of the trucks. Consequently, it moves with great facility and greatly reduces friction.

What I claim is:—

1. A side bearing for railway cars, comprising a load-carrying roller, and a member having a bearing surface coöperating with the load-carrying surface of said roller and also having a convex bottom surface curved upwardly from the middle toward each end of the bearing and arranged to roll with reference to the lower bolster member.

2. A side bearing for railway cars, comprising a roller, a rolling concavo-convex member carried by the lower bolster and having a bearing surface supporting said roller, said member being arranged to permit the roller to travel on said bearing surface in a horizontal plane between the bolsters when the upper bolster is down and to cause it to return by gravity to central position, and means for preventing said rolling member from escaping from the lower bolster.

3. A side bearing for railway cars, comprising a roller, a rolling concavo-convex member carried by the lower bolster and having a bearing surface supporting said roller, said member being arranged to permit the roller to travel on said bearing surface in a horizontal plane between the bolsters when the upper bolster is down and to cause it to return by gravity to central position, and a housing for confining the roller in the bearing.

4. A housing casting having a roller and track face within the housing and curved rocker plate located within the housing and adapted to rock on the track surface of the housing, a roller mounted within the housing and adapted to roll on the curved plate, the form of the curved plate being such as to return the roller by gravity of the plate to a normal central position and the thickness of said plate being relatively thin as relates to the diameter of the roller.

5. In a device of the class described a housing casting for a roller, a track surface within the housing and a curved rocker plate located on the track surface within the housing and adapted to rock upon this surface, a roller mounted on the curved plate and adapted to roll lengthwise on the plate and cause the plate to rock as the roller moves, holes in the sides and ends of the housing which permit the escape from the region of the track surface of any obstructive material.

In testimony whereof I have hereunto set my hand.

ARNOLD STUCKI.

Witnesses:
ELBERT L. HYDE,
WILLIAM B. WHARTON.